(12) United States Patent
Gresham

(10) Patent No.: US 7,088,339 B2
(45) Date of Patent: Aug. 8, 2006

(54) ERGONOMIC INPUT DEVICE

(76) Inventor: Mike Gresham, 4704 W. 60th St., Edina, MN (US) 55424

( * ) Notice: Subject to any disclaimer, the term of this patent is extended or adjusted under 35 U.S.C. 154(b) by 297 days.

(21) Appl. No.: 10/448,839

(22) Filed: May 30, 2003

(65) Prior Publication Data
US 2004/0239631 A1 Dec. 2, 2004

(51) Int. Cl.
G09G 5/00 (2006.01)
G06F 1/16 (2006.01)
(52) U.S. Cl. ........................ 345/168; 361/680
(58) Field of Classification Search ........ 345/168–172; 400/691; 361/680–683
See application file for complete search history.

(56) References Cited

U.S. PATENT DOCUMENTS

| | | | |
|---|---|---|---|
| 3,990,565 A | | 11/1976 | Felton et al. |
| 4,055,734 A | | 10/1977 | Hayden |
| 4,202,640 A | | 5/1980 | Schmidt et al. |
| 5,137,384 A | | 8/1992 | Spencer et al. |
| 5,267,127 A | * | 11/1993 | Pollitt .......................... 361/680 |
| 5,351,066 A | * | 9/1994 | Rucker et al. .............. 345/168 |
| 5,410,333 A | * | 4/1995 | Conway ..................... 345/169 |
| 5,426,449 A | | 6/1995 | Danziger |
| 5,543,790 A | * | 8/1996 | Goldstein ..................... 341/22 |
| 5,612,691 A | * | 3/1997 | Murmann et al. ............ 341/22 |
| 5,635,955 A | * | 6/1997 | Maynard, Jr. ................ 345/157 |
| 5,874,906 A | | 2/1999 | Willner et al. |
| 5,883,690 A | | 3/1999 | Meyers et al. |
| 6,081,207 A | * | 6/2000 | Batio .......................... 341/20 |
| 6,107,988 A | | 8/2000 | Phillipps |
| 6,132,118 A | | 10/2000 | Grezeszak |
| 6,630,924 B1 | * | 10/2003 | Peck .......................... 345/168 |
| 6,658,272 B1 | * | 12/2003 | Lenchik et al. ............. 345/164 |
| 6,698,957 B1 | * | 3/2004 | Huang ........................ 400/472 |
| 6,741,455 B1 | * | 5/2004 | Karidis et al. .............. 361/680 |
| 6,882,854 B1 | * | 4/2005 | Kobayashi ................... 455/502 |

* cited by examiner

Primary Examiner—Xiao Wu
Assistant Examiner—M. Fatahiyar
(74) Attorney, Agent, or Firm—Patterson, Thuente, Skaar & Christensen, P.A.

(57) ABSTRACT

This invention relates to ergonomically designed input devices, and methods of using these devices, that are suitable for use with computers, gaming consoles, or electronic typewriters. In one embodiment the present invention comprises a keyboard housing, which is adapted to contain the components of a keyboard, comprising a first side and a second side. The first side is operably and pivotally coupled to the second side, and the first and second sides of the keyboard housing include a front face, a back face and side portions. In this embodiment, a plurality of input keys for inputting data into an electronic device can be located on the front face of at least one of the first and second sides of the keyboard housing. In one embodiment, the first side and the second side of the keyboard housing can pivot, which allows the operator to adjust the keyboard housing to fit the contours of the operator's hands and wrists.

20 Claims, 8 Drawing Sheets

ERGONOMIC INPUT DEVICE

FIELD OF THE INVENTION

The field of the present invention relates generally to data input devices and more specifically to ergonomically designed input devices for use with, for example, computers, electronic typewriters, gaming consoles and the like.

BACKGROUND OF THE INVENTION

Input devices designed to be used with computers and electronic typewriters were originally based upon the keyboard designs of mechanical typewriters. As such, the keys were placed directly in front of the computer, or electronic typewriter, on a substantially horizontal keyboard. A consequence of this design is that the operator is forced to place his/her hands, wrists and/or shoulders in an unnatural position in order to enter data into the computer or electronic typewriter. It has been discovered that several problems can be associated with the unnatural positions required to use conventional keyboards. One of these problems is carpal tunnel syndrome, or CTS. It is believed that CTS may be caused by the bunching of sheaths, which surround tendons in the hands, that occurs when the wrists are bent while using a conventional keyboard. This bunching, in turn, can affect the median nerve in the carpel tunnel and may lead to CTS. Generally, CTS is characterized by sharp pains in the wrist and fingers, and in extreme cases can be permanently debilitating.

While CTS is one type of repetitive stress injury, several other injuries can be caused by prolonged and repetitive use of conventional keyboards. For example, conventional keyboards require the operator's wrists and forearms to be in an unnatural position in order to adjust to the horizontal plane of the keyboard. This can lead to muscle and tendon strain in the operator's wrist and arms. Furthermore, the unnatural position associated with conventional keyboards can place the weight of the operator's arms on his/her shoulders, neck and back, which may lead to unnecessary stress on the shoulder, neck and back muscles.

Recent statistics indicate that CTS and other repetitive stress injuries are some of the fastest growing occupational injuries in the United States. Furthermore, it has been estimated that 50 percent of the work force could eventually suffer from CTS or other repetitive stress injuries. The costs to both employers and employees as a result of computer, and specifically keyboard, related repetitive stress injuries are expected to be significant. Thus, there is a need for input devices, and more specifically keyboards, that are designed to minimize repetitive stress injuries.

Currently, there are several types of ergonomically designed keyboards. See, for example, U.S. Pat. No. 5,137,384 to Spencer et al.; U.S. Pat. No. 5,426,449 to Danziger; and U.S. Pat. No. 6,132,118 to Grezeszak. These patents show alternate designs for keyboards that provide wrist support and/or a non-horizontal keyboard surface. However, none of the above-mentioned patents disclose a keyboard housing that both supports the operator's arms/wrists and can be adjusted and/or pivoted to conform to the particular contours of the operator's hands and arms. With the number of jobs that require extended periods of computer use, it would be desirable to provide an input device that could address the limitations of the above-mentioned patents.

SUMMARY OF THE INVENTION

This invention relates to ergonomically designed input devices, and methods of using these devices, that are suitable for use with, for example, computers, gaming consoles, or electronic typewriters. In one aspect, the invention pertains to a data entry device comprising a keyboard housing, which can be adapted to contain the components of a keyboard, with a first side and a second side. The first side can be operably and pivotally coupled to the second side, and the first and second sides of the keyboard housing include a front face, a back face and side portions. In this embodiment, a plurality of input keys for inputting data into an electronic device can be provided to the front face of at least one of the first and second sides of the keyboard housing. In this embodiment, the first side and the second side of the keyboard housing can pivot, which allows the operator to adjust the keyboard housing to fit the contours of the operator's hands and wrists. In some embodiments, the keyboard housing can also rotate relative to the arm supports.

In a further aspect, the invention pertains to a data entry device comprising one or more arm supports extending from the data entry device, the arm supports adapted to support an operator's arms. In these embodiments, the data entry device further comprises a housing rotationally coupled to the one or more arm supports. The housing can have a front face, a back face and side portions, and the housing can be configured to contain electrical components electrically connectable with a processor. In one embodiment, the housing can rotate relative to the one or more arm supports. In some embodiments, the housing further comprises a first segment and a second segment, the first segment being pivotally connected to the second segment, wherein each of the first segment and the second segment have a plurality of input devices provided thereto.

In addition, the invention pertains to a method of inputting data. In this embodiment, the method comprises providing a data entry device, the data entry device having a first side and a second side, adjusting one or more arm supports of the data entry device to ergonomically support a user. In one embodiment, the method further comprises rotating the data entry device relative to a base to ergonomically align the data entry device, pivoting the first side relative to the second side to ergonomically align the data entry device for the user, and entering data by actuating one or more data entry components.

In another aspect, the invention pertains to a data entry device comprising a means for housing the components of a data entry device, the housing means including means for ergonomically adjusting the housing means about a vertical axis. In this embodiment, the data entry device further comprises means for ergonomically adjusting the housing means about a horizontal axis and means for supporting a user's hands when entering data.

In a further aspect, the invention pertains to a data entry device comprising a housing adapted to contain the components of an input device. In these embodiments, the housing can comprise a first side and a second side, wherein the first side can be operably and pivotally connected to the second side, and wherein the first side and the second side each include a front face, a back face and side portions. In some embodiments, a plurality of input keys can be provided to the front face of at least one of the first and second sides. In one embodiment, the input device further comprises arm supports operably connected to the housing.

Additionally, the invention pertains to a method of adjusting a data entry device, wherein the data entry device comprises a whole defined by a first half and a second half. In these embodiments, the method comprises slidably adjusting the whole data entry device along a vertical axis, vertically adjusting the whole data entry device about a horizontal axis, and pivotally adjusting the first half of the data entry device to the second half of the data entry device.

DETAILED DESCRIPTION OF THE PREFERRED EMBODIMENTS

Figure 1:
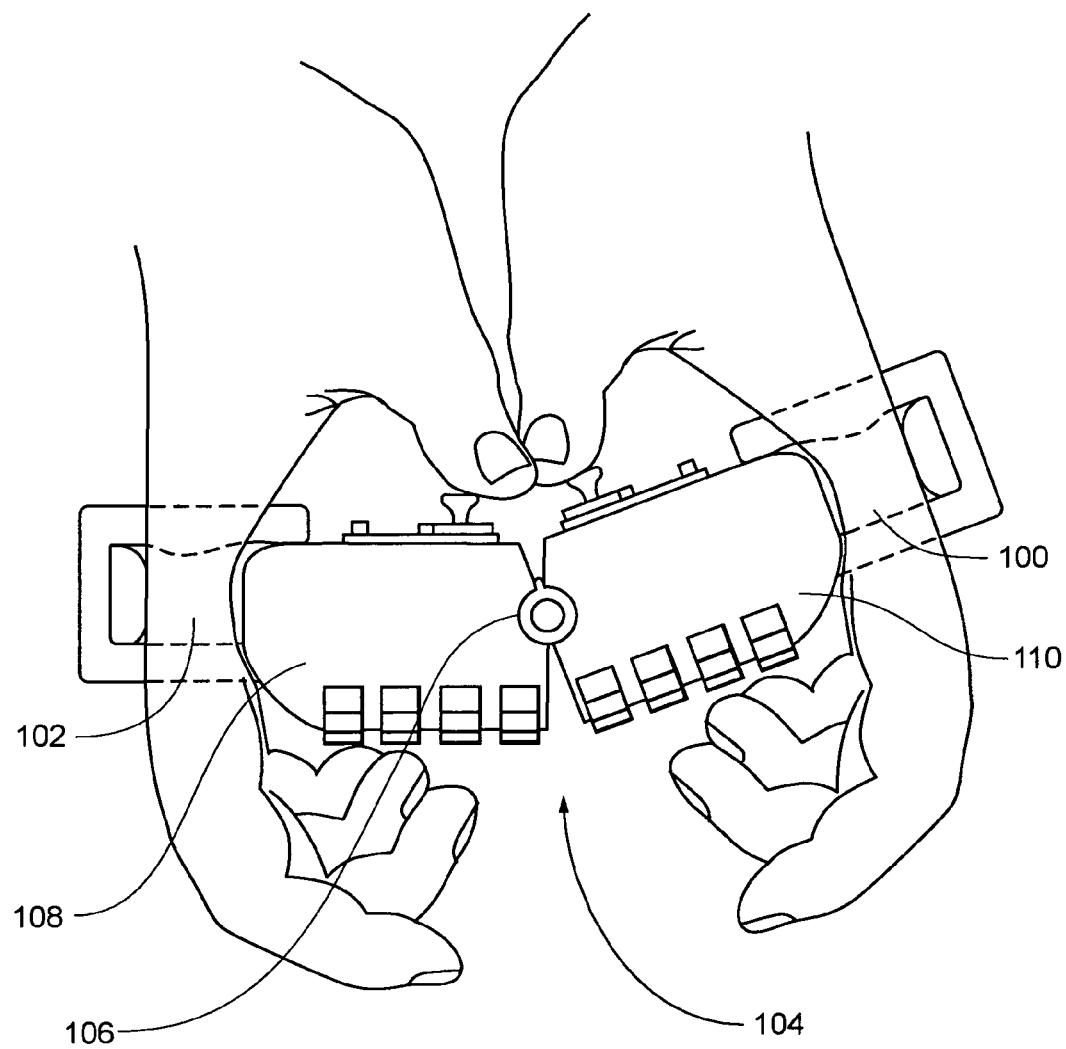
FIG. 1 is a top view of an embodiment of the input device showing an operator's arms and hands positioned on the input device.

FIGS. 4, 5, 6, and 7 show a first embodiment of the input device according to the present disclosure. Referring to FIG. 1, the input device has a first arm support 100 and a second arm support 102 designed to accommodate the arms and/or wrists of an operator. In one embodiment, a housing 104, which in one embodiment comprises a first side 108 and a second side 110, is operably coupled to the first arm support 100 and the second arm support 102. In one embodiment, the housing 104 is, for example, a keyboard housing that is adapted to contain the electrical and functional components of a keyboard. In other embodiments, the housing 104 is a game controller adapted to contain the electrical and functional components of a game controller. In some embodiments, the housing 104 has a pivot 106, which pivotally and operably couples the first side 108 and the second side 110 of the housing 104. Pivot 106 permits each side of the housing 104 to pivot.

Figure 2:
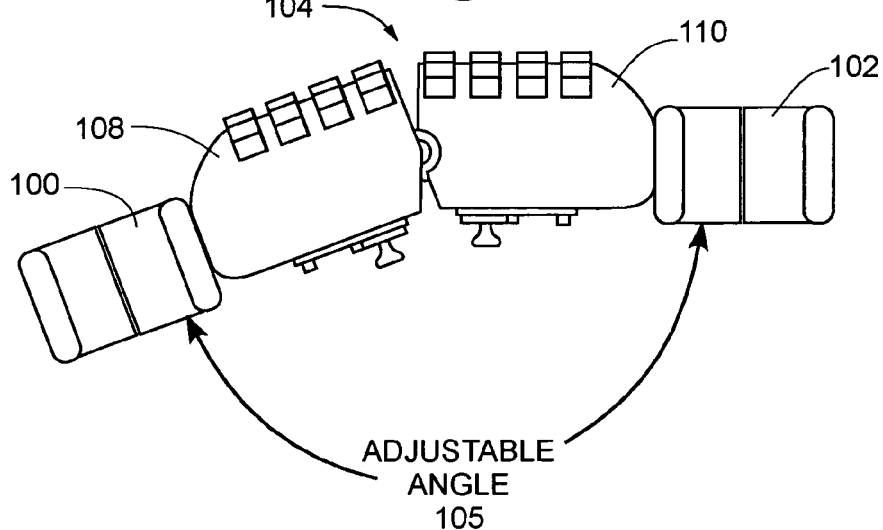
FIG. 2 is a top view of an embodiment of the input device showing the adjustable angle of the arm supports.

FIGS. 2, 3, 8 and 9 depict a preferred embodiment of an input device where the first side 108 and the second side 110 pivot about an axis. In some embodiments, the first side 108 and the second side 110 each pivot about 45 degrees, while in other embodiments the first side 108 and the second side 110 each pivot from about 10 degrees to about 40 degrees. One of ordinary skill in the art will recognize that additional pivot ranges within the explicit range is contemplated and within the present disclosure. Referring to FIG. 2, the pivoting of the first side 108 and the second side 110 of housing 104 allows angle 105 between the first arm support 100 and the second arm support 102 to be adjusted. Thus, by adjusting angle 105, the operator may comfortably position his/her arms on the input device. Furthermore, the pivoting feature of housing 104 also allows the operator to adjust the shape of the input device to ergonomically fit his/her hands and fingers.

Figure 3:
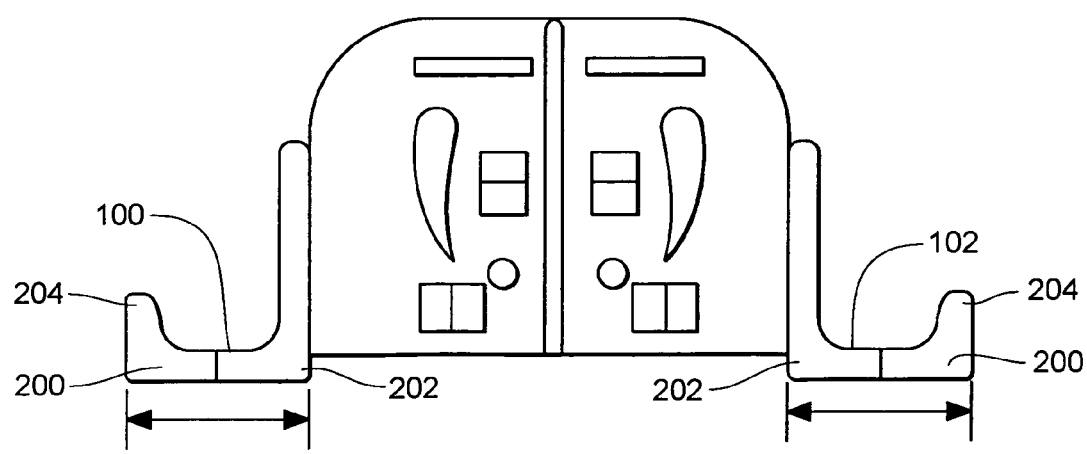
FIG. 3 is a back view of an embodiment of the input device.

Referring to FIG. 3, in some embodiments, the first arm support 100 and the second arm support 102 have adjustable widths. In some embodiments, the adjustable widths of the arm supports 100, 102 are provided by a slot and projection mechanism, which allows the arm supports 100, 102 to be optionally moved towards or away from the housing 104. For example, as shown in FIG. 3, the arm supports 100, 102 can comprise a first part 200 and a second part 202. In one embodiment, first part 200 has a projection that interfaces with a slot formed in second part 202. The slot and projection mechanism allows first part 200 to be laterally adjusted, or moved, in relation to second part 202. In some embodiments, the projections, which fit into the slots, may have grooves that define predetermined widths for the arm supports 100, 102. In other embodiments, the projections do not have grooves, and thus the arm supports 100, 102 do not have predetermined widths. The present disclosure is not limited to slot and projection mechanisms, and one of ordinary skill in the art will recognize that any mechanism that allows the width of the arm supports 100, 102 to be adjusted, or extended, may be used.

Additionally, in some embodiments, arm supports 100, 102 can include upwardly extending portions 204, which provide additional support for an operator's arms. The adjustable arm supports 100, 102 provide additional flexibility and ergonomic control to the input device, and permits the input device to be comfortably used by a variety of individuals with varying arm/wrist sizes.

Figure 4:
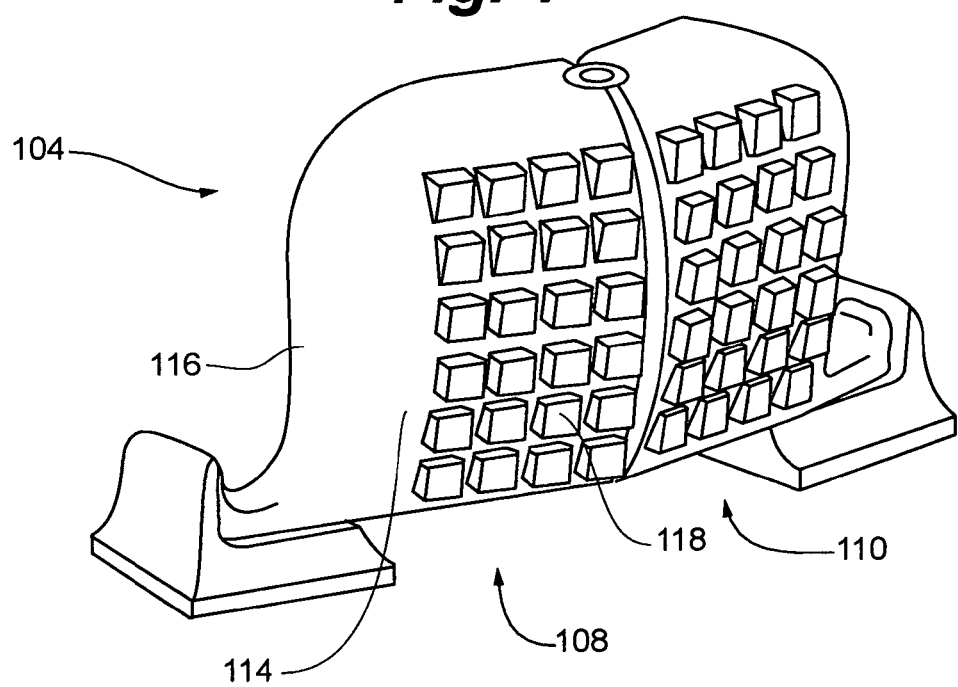
FIG. 4 is a perspective view of an embodiment of the input device showing the front face and side portions of the input device.
Figure 5:
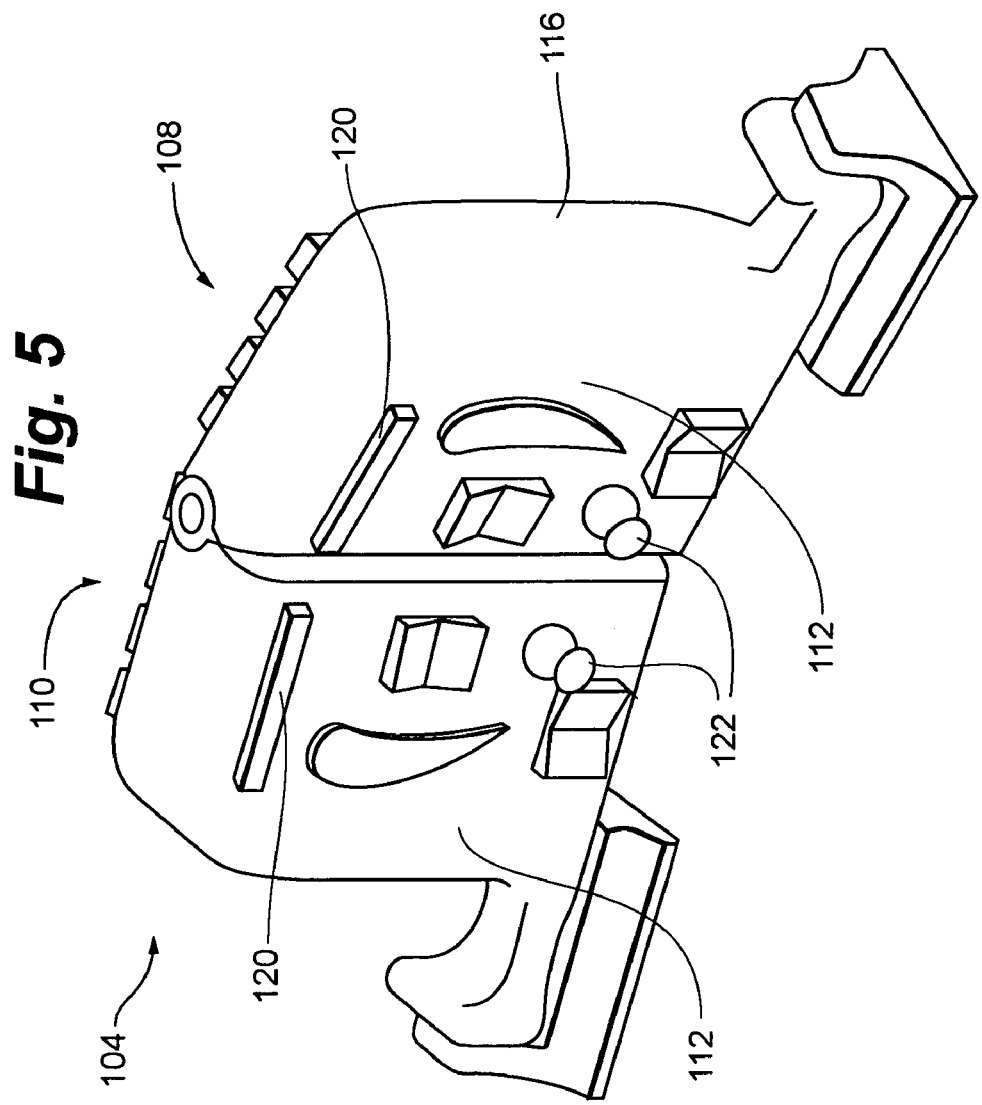
FIG. 5 is a perspective view of an embodiment of the present invention showing the back face and side portions of the input device.

Referring to FIGS. 4 and 5, the first side 108 and the second side 110 of the housing 104 each have a back face 112, a front face 114 and side portions 116. In one embodiment, a plurality of input keys 118 can be located on the front face 114 of the housing 104. In some embodiments, the plurality of input keys 118 are located on front face 114 of only one side of the housing 104, while other embodiments have a plurality of input keys 118 located on the front face 114 of both the first side 108 and the second side 110. In some embodiments, the plurality of input keys 118 are arranged in a typical QWERTY fashion; however, further embodiments may have the plurality of input keys 118 arranged in other configurations. No particular input key arrangement is required by the present disclosure and the choice of input key arrangement for any one embodiment will generally be guided by the intended application.

In some embodiments, the plurality of input keys 118 are general input keys that are associated with military electronics, medical instruments, video games, industrial controls, and the like. In other embodiments, the plurality of input keys 118 are alphabetic or numeric keys, and in further embodiments the plurality of input keys 118 are alpha/numeric keys. The back face 112 of each side of the housing 104 optionally contains one or more space bars 120 and/or joysticks 122. In some embodiments, the back face 112 is provided with shift keys, escape keys, control keys and other keys associated with input devices. In further embodiments, the back face 112 may comprise an integrated mouse, a touchpad, or other electronic scrolling or positioning devices. Alternatively or additionally, input keys such as shift keys, space bars, escape keys, joysticks, electronic scrolling devices, control keys or combinations thereof, are located on the front face 114 of either and/or both sides of the housing 104. In embodiments where the housing 104 is a game controller, one or more joysticks 122 are located on the front face 112, the back face 114, or both, of either side of the housing 104.

In some embodiments, the first side 108 and the second side 110 of the housing 104 have substantially the same number of input keys. In other embodiments, one side of the housing has more input keys than the other side. For example, in some embodiments of the present invention, the front face 114 of the first side 108 of the housing 104 contains more input keys than the front face 114 of the second side 110. In further embodiments, the first side 108 of the housing 104 is larger, in width or length, than the second side 110. Alternatively, in some embodiments, the first side 108 and the second side 110 of the housing 104 have substantially the same dimensions.

Figure 6:
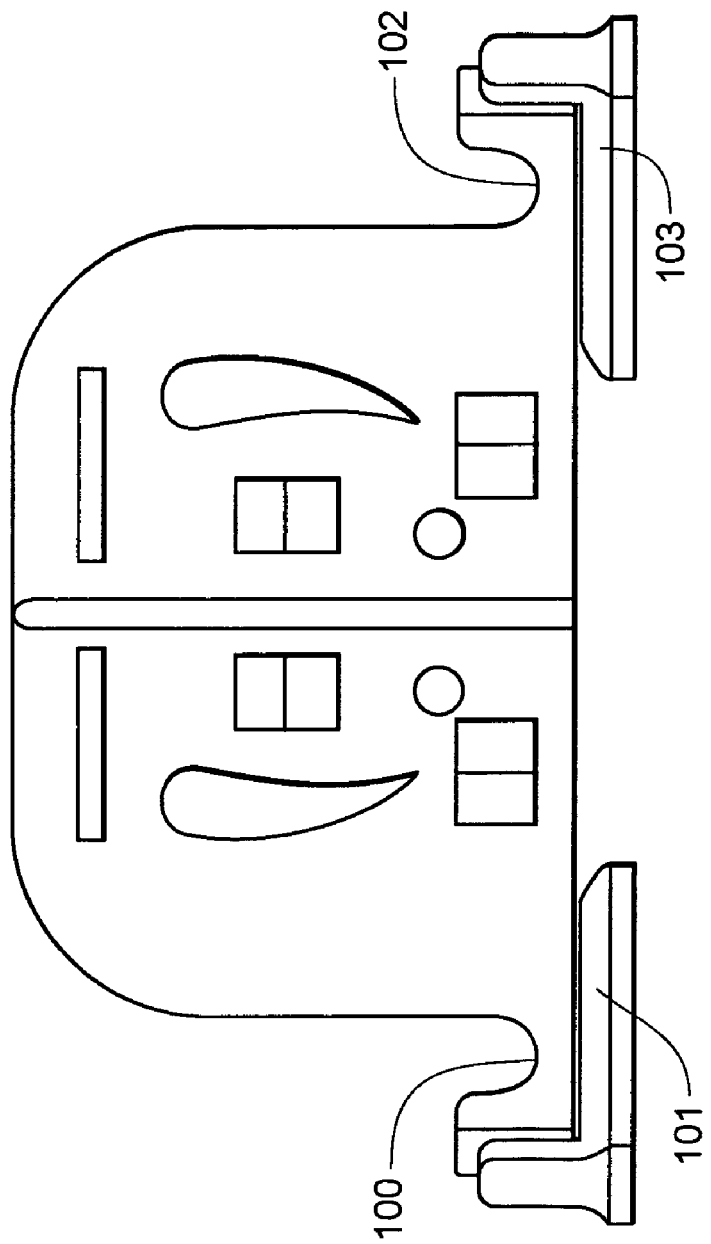
FIG. 6 is a back view of an embodiment of the present invention showing first and second base blocks.
Figure 7:
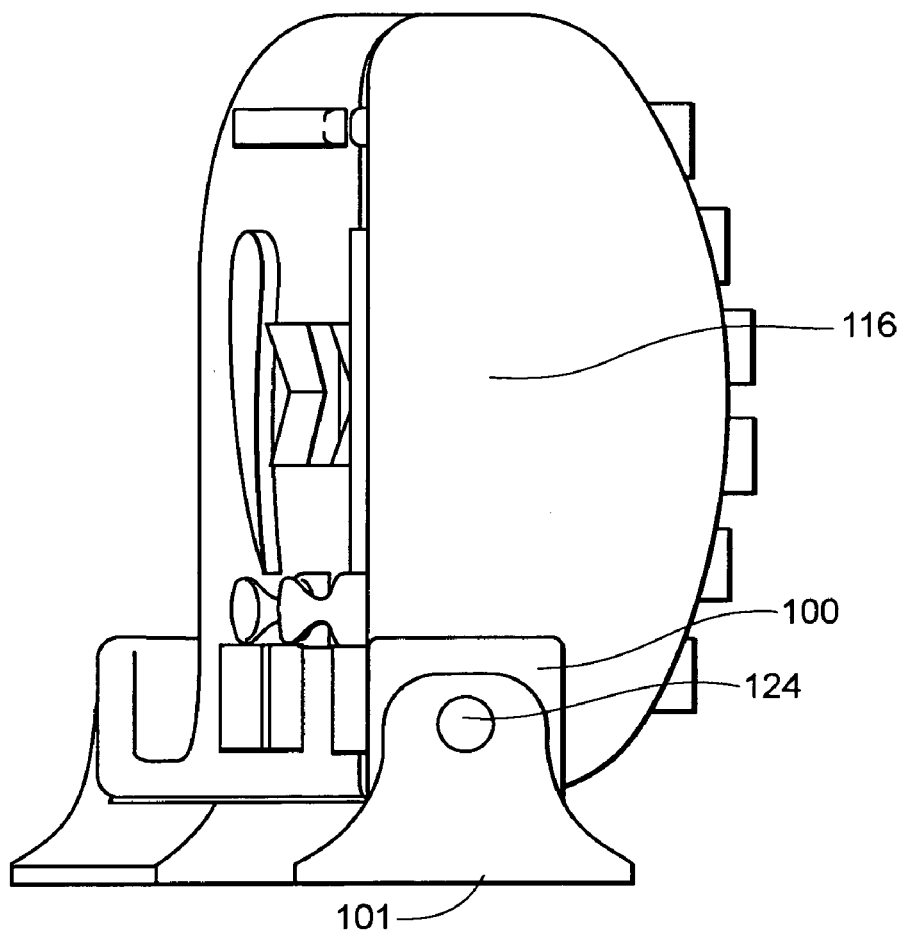
FIG. 7 is a side view of an embodiment of the present invention showing a base block with a rotational pivot.
Figure 8:
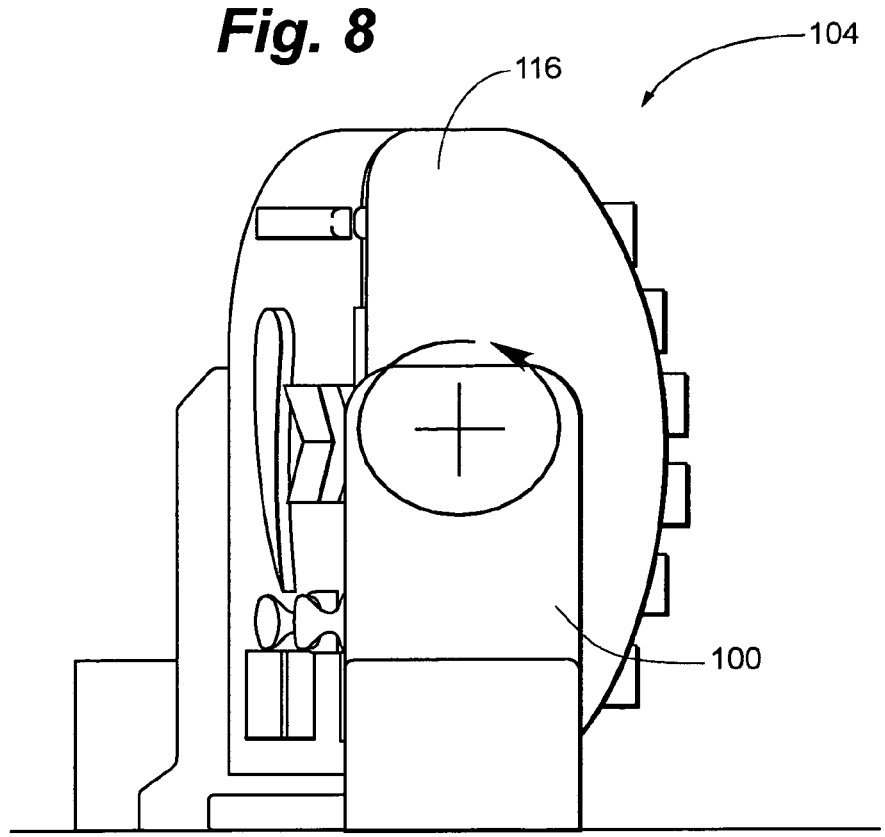
FIG. 8 is a side view of an embodiment of the present invention indicating the rotation of a housing.

Referring to FIG. 6, in some embodiments of the present invention the first arm support 100 and the second arm support 102 are operably connected, or attached, to first and second base blocks 101, 103. The first and second base blocks 101, 103 function to support the input device. Referring to FIG. 7, in one embodiment, the base blocks 101, 103 are rotationally coupled to the first and second arm supports 100, 102 by rotational pivots 124. In one embodiment, the rotational pivots 124 permit the housing 104 to rotate about an axis that is substantially parallel to the base blocks. FIG. 8 shows another embodiment of the present invention where the housing 104 rotates about an axis that is substantially parallel to the base blocks 101, 103. In some embodiments, the housing 104 rotates up to about 360 degrees.

Figure 9:
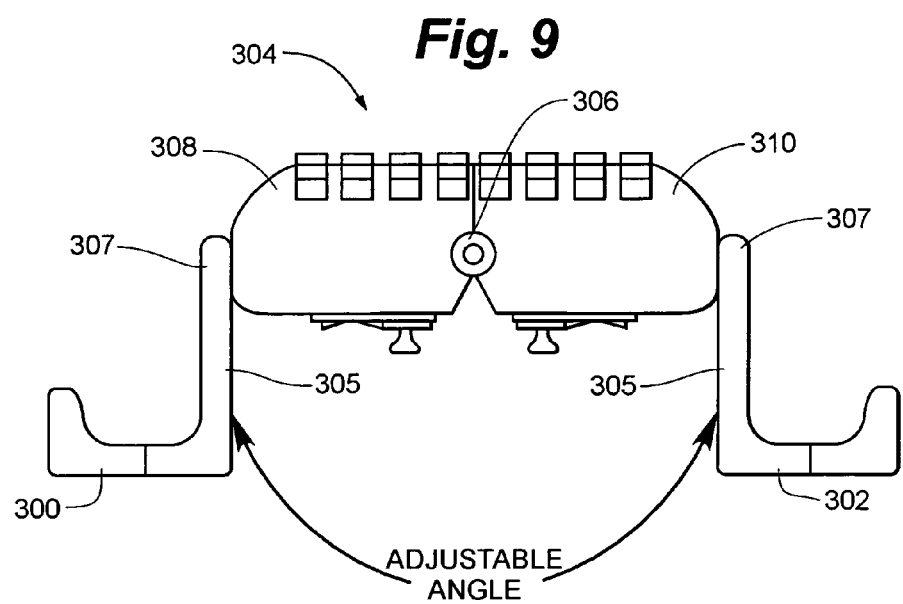
FIG. 9 is a perspective view of an embodiment of the present invention showing a housing rotationally coupled to arm supports.

Referring to FIG. 9, in another embodiment, housing 304 is rotationally coupled to arm supports 300, 302 via a rotational pivots 307. As shown in FIG. 9, the rotational pivots 307 permit the housing 304 to be rotated by the user during use of the input device. In some embodiments, the housing 304 rotates up to about 360 degrees.

As shown in FIG. 9, in some embodiments, housing 304 comprises a first side 308 and a second side 310. In one embodiment, first side 308 is pivotally coupled to second side 310 by pivot 306. The pivoting of the first side 308 and second side 310, along with the rotation of housing 304, permits the user to align, or adjust, the input device into a desired ergonomic position. In some embodiments, housing 304 is provided with a plurality of input keys, joystick(s), e-scrolling devices or combinations thereof.

In some embodiments, the first and second arm supports can be optionally coupled and uncoupled from the housing. The removal, or uncoupling, of the first and second arm supports allows the user to position the housing in a substantially horizontal configuration, which permits the user to operate the input device in a manner that is similar to a conventional keyboard. Additionally, the removal of the first and second arm supports can make the input device easier to fit into, for example, brief cases or other travel cases. In one embodiment, the first and second arm supports are removed from the housing by removing the rotational pivots that rotationally couple the arms supports to the housing.

In some embodiments, connections are provided to operably connect an external screen and/or a power source to the input device (not shown). The connections permit the user to optionally add components, such as external screens and power sources, which allows the input device to function in a stand alone mode of operation.

In general, the rotational pivots can be composed of any material suitable for use in input devices. Suitable materials include, for example, metals, plastics and combinations thereof. In some embodiments, the rotational pivots are, for example, protrusions that operably couple with corresponding structures to provide rotation of the housing. In other embodiments, the rotational pivots are, for example, interface fit pins. One of ordinary skill in the art will recognize that additional rotational pivots exist and are within the scope of the present disclosure.

The pivot of the present disclosure is generally any coupling mechanism that pivotally attaches, or couples, the first side of the housing to the second side. Suitable pivots for the use in the present invention include, but are not limited to, joints and hinges. The pivot is made of any suitable material for use in electronic equipment such as metal, plastic or a combination of metal and plastic components. The choice of pivot material will generally be guided by the intended application. Suitable plastics for use as the pivot include, for example, polyethylene, polystyrene, polycarbonate, PVC and blends and copolymers thereof. In addition, the pivot may be formed into any desired shape for use in the present invention. In one embodiment, the pivot is a cylindrical rod that operably and pivotally couples the first side of the housing to the second side. In other embodiments, the pivot is rectangular. One of ordinary skill in the art will recognize that additional pivot shapes are contemplated and are within the present disclosure.

The arm supports, base blocks, input keys and housing may be made of metal, plastic or any other material suitable for use in electronic equipment. Suitable plastic resins include, but are not limited to, ABS, polycarbonate, polystyrene, PVC, modified polyphenylene oxide and blends and copolymers thereof. Production and methods of making keyboards are generally discussed in, for example, U.S. Pat. No. 4,160,886 to Wright et al. titled "Keyboards and Methods of Making Keyboards;" U.S. Pat. No. 4,202,640 to Schmidt et al. titled "Keyboard Assembly;" and U.S. Pat. No. 4,055,734 to Hayden titled "Keyboard Switch Assembly With Hinged Pushbuttons and Cantilevered Terminal Members," which are hereby incorporated by reference. Additionally, the input devices of the present disclosure may be operably connected to a computer, gaming console or the like by any suitable means. Suitable means for operably connecting the input devices include, for example, wireless connections, USB connections, cables or combinations thereof.

As discussed above, the pivot allows the first side and the second side of the housing to be adjusted. Thus, the operator can position the surface of the housing to fit the particular contours of the operators' hands and wrists. This allows the operator to place his/her fingers and hands in a more natural position, which can alleviate the unnecessary strain and stress placed on the fingers and hands during use of conventional keyboards and input devices. Furthermore, the design of the present invention can support the operator's wrists and arms and prevent the unnatural twisting and bending of wrists that is associated with conventional input devices. Additionally, the adjustable input devices of the present invention may be useful to disabled or physically impaired users who cannot use conventional input devices.

In another embodiment of the present invention, a method for inputting data is provided. In this embodiment, the method comprises providing a data entry device that comprises a housing with a first side and second side. In some embodiments, the first side can be operably and pivotally coupled to the second side. In some embodiments, the data entry device further comprises adjustable first and second arm supports operably coupled to the housing. In one embodiment, a plurality of input keys can be located on the front face of at least one of the first and second sides of the housing for inputting data. In some embodiments, the method further comprises adjusting the arm supports to ergonomically support a particular operator's arms and wrists, and pivoting the first side and second side of the housing to place the housing in a position that is desirable for the operator. In some embodiments, the method also comprises rotating the housing to ergonomically align the input device, and entering data by actuating one or more of the plurality of input keys.

In some methods of operation, the optional base blocks of the input device may be placed on a table or desk and the operator can position his/her arms in the first and second arm supports. In other methods of entering data, the base blocks can be placed in the operator's lap and the operator's arms can be supported by the first and second arm supports.

The embodiments are intended to be illustrative and not limiting. Additional embodiments are within the claims. Although the present invention has been described with reference to particular embodiments, one skilled in the art will recognize that changes may be made in form and detail without departing from the spirit and the scope of the invention.

The invention claimed is:

1. A data entry device comprising:
   a keyboard housing adapted to contain the components of a keyboard, the keyboard housing comprising:
   a first side;
   a second side, wherein the first side is operably and pivotally connected to the second side, and wherein the first side and the second side each include a front face, a back face and side portions;
   a plurality of input keys provided to the front face of at least one of the first and second sides; and
   arm supports operably connected to and laterally extending from the keyboard housing, wherein the keyboard housing can rotate relative to the arm supports, the arm supports extending below the keyboard housing sufficient to contact a work surface whereby the housing can be maintained above the work surface with sufficient clearance to prevent the work surface from interfering with rotation of the housing.

2. The device of claim 1 wherein the width of each of the arm supports is adjustable.

3. The device of claim 1 wherein the first side and the second side of the keyboard housing can pivot about an axis that is substantially perpendicular to the arm supports.

4. The device of claim 1 further comprising input keys provided to the back face of at least one of the first side and the second sides of the keyboard housing.

5. The device of claim 1 wherein the plurality of input keys comprise alpha/numeric keys.

6. The device of claim 1 wherein the input keys comprise general input keys associated with military electronics.

7. The device of claim 1 wherein the input keys comprise general input keys associated with video games.

8. The device of claim 1 further comprising at least one positioning device provided to one or both of the front face and the back face of the keyboard housing.

9. The device of claim 1, wherein the arm supports include upwardly facing end portions.

10. A data entry device comprising:
    one or more arm supports extending from a housing, the arm supports adapted to support an operator's arms; and
    the housing rotationally coupled to the one or more arm supports, the housing having a front face, a back face and side portions, wherein the housing is configured to contain electrical components electrically connectable with a processor, the one or more arm supports maintaining the housing above a work surface to permit the housing to rotate along its longitudinal axis, wherein the housing further comprises a first side and a second side, the first side pivotally connected to the second side, wherein at least one of the first side and the second side have a plurality of input keys provided thereto.

11. The device of claim 10 wherein the width of each arm support is adjustable.

12. The device of claim 11, wherein the arm supports include upwardly extending end portions.

13. The device of claim 10, wherein a positioning device is provided to at least one of the first segment or second segment.

14. The device of claim 10, wherein the one or more arm supports can be optionally coupled and uncoupled to the housing.

15. A method of inputting data comprising the steps of:
    providing a data entry device, the data entry device having a housing with a first side and a second side, and a plurality of arm supports operably connected to the housing;
    placing the data entry device on a working surface so that the arm supports contact the surface and maintain a clearance between the housing and the surface;
    adjusting the plurality of arm supports of the data entry device to ergonomically support a user;
    pivoting the first side relative to the second side to ergonomically align the data entry device for the user;
    rotating the data entry device along its longitudinal axis to ergonomically align the data entry device for the user, and
    entering data by actuating one or more data entry components.

16. The method of claim 15 wherein the step of entering data further comprises depressing one or more input keys.

17. The method of claim 15 wherein the step of entering data further comprises actuating a positioning device.

18. A method of adjusting a data entry device, wherein said data entry device comprises a whole defined by a first half and a second half, each half including an arm support operably coupled thereto, the method comprising:
    rotationally adjusting said whole data entry device about a horizontal axis;
    pivotally adjusting said first half of said data entry device to said second half of said data entry device; and
    extendably adjusting each arm support to a desired width.

19. The device of claim 1 wherein the arm supports further comprise base blocks operably coupled to the arm supports.

20. The device of claim 10 wherein the arm supports further comprise base blocks operably coupled to the arm supports.

* * * * *